J. N. TIMAR.
ANIMAL TRAP.
APPLICATION FILED MAR. 31, 1919.
1,335,304.
Patented Mar. 30, 1920.
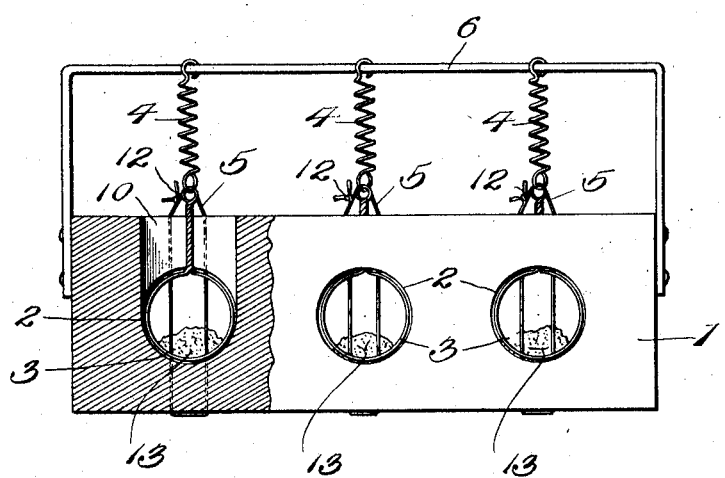
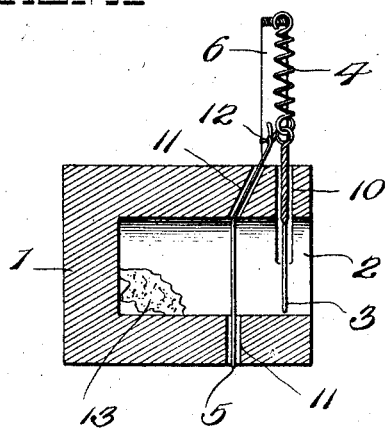
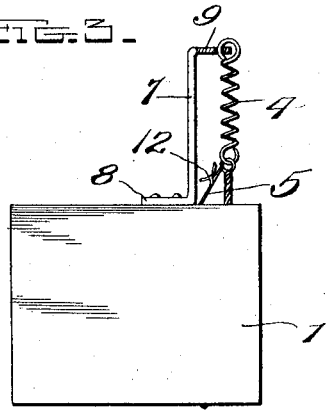
Inventor
John N. Timar,
By L. L. Townshend
Attorney
Witness
I. R. Pierce

UNITED STATES PATENT OFFICE.

JOHN N. TIMAR, OF WARREN, OHIO.

ANIMAL-TRAP.

1,335,304.    Specification of Letters Patent.    Patented Mar. 30, 1920.

Application filed March 31, 1919. Serial No. 286,247.

*To all whom it may concern:*

Be it known that I, JOHN N. TIMAR, citizen of the United States, residing at Warren, in the county of Trumbull and State of Ohio, have invented certain new and useful Improvements in Animal-Traps, of which the following is a specification.

My invention has for its object to provide an extremely simple and inexpensive, yet a highly efficient and reliable trap for mice and rats, particularly the former, although the device could well be used for catching other small animals.

With the foregoing in view the invention resides in the novel construction herein described and claimed and shown in the accompanying drawing.

Figure 1 is a front elevation partly in section.

Fig. 2 is a vertical transverse section.

Fig. 3 is an end elevation showing a modified form of construction.

The improved trap consists essentially of a block of wood or other material having one or more openings 2 of a size for a mouse or other rodent to enter; a spring support carried by the block 1 and having a part located over the same; a choking ring or noose 3 for each opening 2; a coiled spring 4 attached to the support for jerking each noose upwardly around the neck of an entrapped mouse or the like; and a cord 5 extending across each opening 2 to prevent operation of the spring until said cord is cut by the mouse or other animal in an endeavor to reach the bait at the rear end of the opening 2.

The support above mentioned may be in the form of an arched bar 6 as seen in Figs. 1 and 2, the ends of said bar being secured to the ends of the block 1, or a strip of metal 7 such as seen in Fig. 3 may be used. One strip 7 is located at each opening 2 and for securing these strips in place, their lower ends are preferably bent laterally at 8 and nailed to the block 1. The upper end of each strip 7 may be bent forwardly as seen at 9 for the attachment of the spring 4. When the bar 6 is used the springs are connected to its crown as shown.

From each opening 2, a slot 10 leads to the top of the block 1 and the choking rings or nooses 3 slide upwardly into these slots when moved by the springs 4, but this takes place only when the cord 5 is severed. The cord in question passes through openings 11 in the block and extends across the opening 2, being connected to the spring 4. It thus follows that when the cord is pulled to stretch the spring and then tied as at 12, the noose 3 will be alined with the opening 2 and the cord will form a barrier in front of the bait 13.

As illustrated clearly in Figs. 1 and 2, the ring or noose 3 is disposed entirely within the chamber and the bottom of the noose is seated on the chamber bottom when the trap is set. Thus the chamber bottom will act as a stop to limit downward movement of the noose allowing the cord 5 to be tightened to the utmost.

When a mouse or the like inserts its head into the opening and noose and gnaws the cord 5, the spring 4 immediately comes into play to jerk said noose upwardly, thus choking the mouse if not breaking the neck.

The device is extremely simple and inexpensive, yet is efficient and reliable and since probably the best results are obtainable from the details disclosed they are preferably followed. Within the scope of the invention as claimed however, numerous minor changes may be made.

I claim:

A rat trap comprising a block having a plurality of chambers formed therein, said chambers having vertical slots in their tops, each chamber having vertical openings in its bottom and inclined openings in its top, said openings being spaced rearwardly from said vertical slot and the inclined openings extending upwardly toward the vertical slot, a noose mounted to freely slide in the vertical slot and to partake of restricted lateral movements, an inverted U-shaped rod secured to the block and extending over all of said chambers, retractile coil springs secured to the rod and connected with said nooses to move them upwardly and to permit of their slight lateral movements, and a cord passing through the vertical and inclined openings of each chamber and tied to the noose at its upper end to normally hold said noose lowered, the inclined openings causing the upper portion of the cord to assume a diagonal position and exert a lateral pull upon the noose whereby it is brought into engagement with the side wall of the slot and held against rattling.

In testimony whereof I affix my signature.

JOHN N. TIMAR.